Sept. 10, 1968   J. E. CARROLL ET AL   3,401,289
MULTIPLE OUTPUT DIRECT CURRENT GENERATOR
Filed May 17, 1965   2 Sheets-Sheet 1
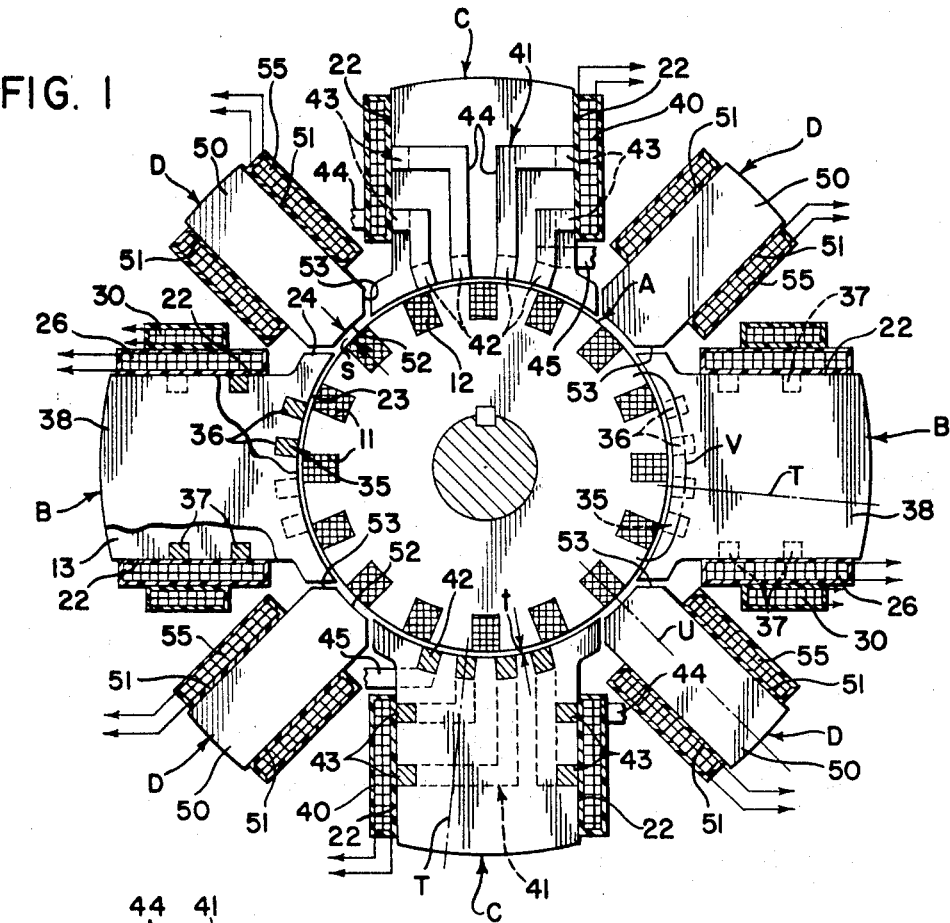
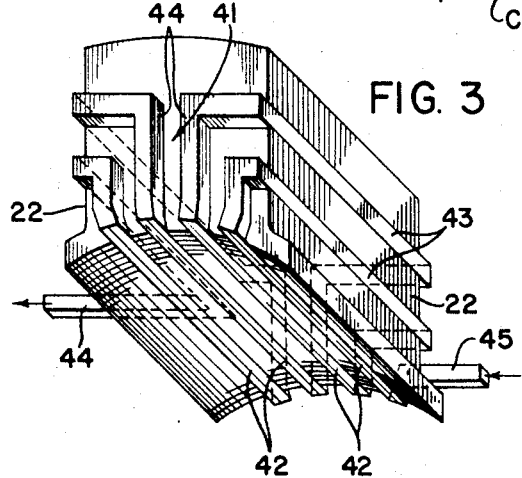
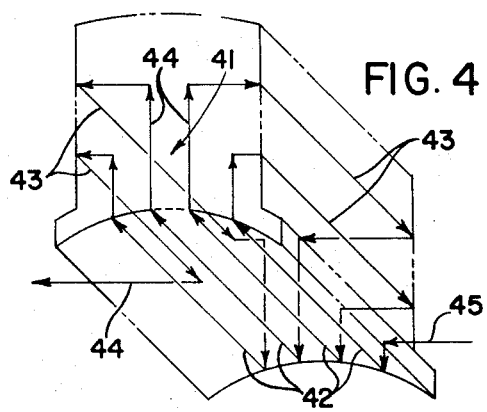
INVENTORS.
JOHN E. CARROLL &
GEORGE G. LANDIS
BY
*Tilberry & Body*
ATTORNEYS

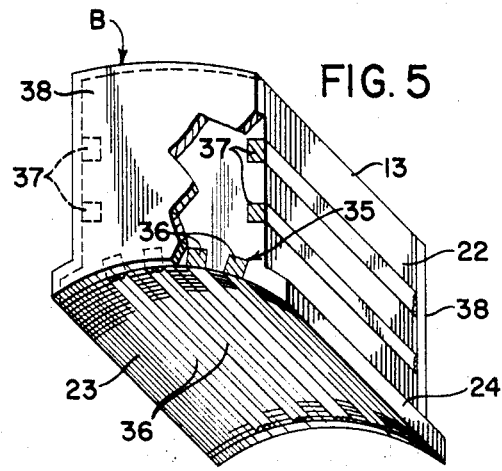
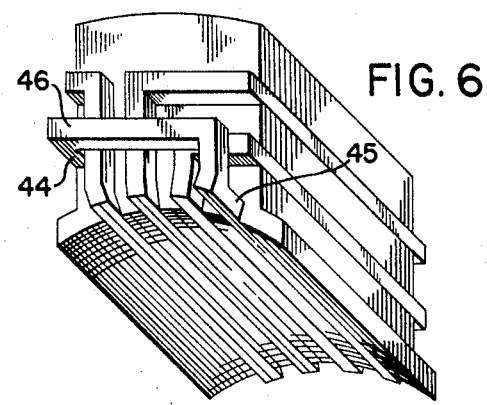
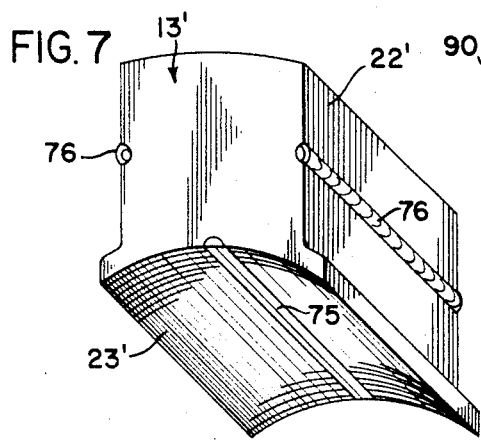
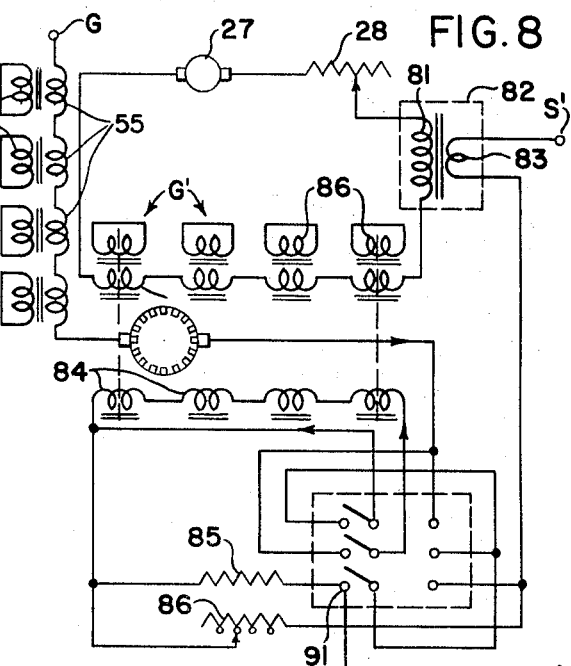
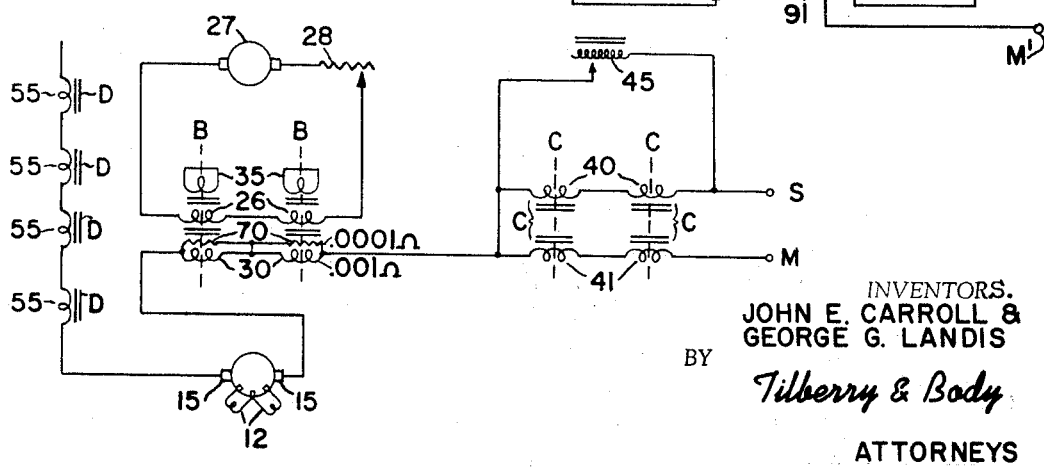

United States Patent Office

3,401,289
Patented Sept. 10, 1968

3,401,289
MULTIPLE OUTPUT DIRECT
CURRENT GENERATOR
John E. Carroll, Lyndhurst, and George G. Landis, South
Euclid, Ohio, assignors to The Lincoln Electric Company, Cleveland, Ohio
Filed May 17, 1965, Ser. No. 456,341
23 Claims. (Cl. 310—183)

ABSTRACT OF THE DISCLOSURE

This application describes a direct current welding generator which may optionally be used either for welding requiring a generator having a drooping volt ampere curve or welding requiring a generator having constant potential low internal impedance characteristics. Each field pole is provided with an auxiliary winding or loop having an axially extending side in the rotor facing surface and axially extending sides radially spaced from the rotor facing surface with the windings or loops being so arranged as to oppose circumferential changes in the flux in the field pole core caused by changes in the output current. These axially extending sides may be formed either by welds extending in the rotor and circumferentially facing surfaces of the field pole core or by electrical conductors embedded in these surfaces which are appropriately electrically interconnected.

---

This invention pertains to the art of electric power generation and more particularly to a rotating, direct-current generator having improved recovery characteristics after having had sudden changes in its load circuit.

The invention is particularly applicable to a direct-current generator for supplying electric power to consumable electrode, electric arc welding processes and will be described with particular reference thereto although it will be appreciated that the invention has broader and other applications.

In the art of consumable electrode, electric arc welding, a voltage on the order of 20–45 volts is required to maintain the arc at currents which may vary all the way from 50 to 1,000 amperes or more depending upon the electrode size and rate of feeding of the electrode toward the workpiece.

It has long been conventional to supply this power from a rotating, direct-current generator having a maximum open circuit voltage on the order of 55 to 90 volts which decreases with an increase in current such that at the desired welding current, the voltage is that required to maintain the arc, and a short circuit current approximately 33 to 50% higher than the desired welding current. Such generators are said to have a drooping volt ampere output curve and have long been used in what may be termed heavy wire electrode welding.

Such generators usually include a rotating commutated armature winding, a plurality of field poles, and a plurality of interpoles. The field poles have both shunt windings connected to a direct current excitation source and series windings connected in series with the armature output and so polarized as to oppose and decrease the flux in the armature windings with an increase in output current. The interpoles have windings in series with the output and are provided to assist commutation.

More recently there has been developed a process termed "short arc welding" wherein the diameter of the electrode may be as small as 1/32 of an inch. Such a process requires a generator having a constant potential output of around 12–25 volts. Such generators are similar in construction to the drooping volt-ampere curve generator with the exception that the armature winding has a fewer number of turns because of the decreased maximum open circuit voltage and the series field windings, instead of being differentially connected, are cumulatively connected. The flux of the cumulative windings is added to that of the field pole windings in an amount to compensate for the resistance and armature reaction losses in the generator. Dependent on the number of ampere turns in these cumulative windings, as the current increases, the output voltage curve can be made to be flat, sloping up or sloping down until the current output is from three to five times the desired welding current where the voltage drops off rapidly to zero.

Normally, it would appear that a drooping volt ampere curve generator could be converted to a constant potential generator suitable for use in short arc welding by simply reversing the polarization of the series field coils and reducing the excitation of the shunt field coils so that the open circuit voltage is as desired. Experience has shown, however, that such a converted generator is quite unsatisfactory for constant potential short arc welding and heretofore it has been the practice to use separate generators for each process.

Analysis of the mechanics of the welding arc to determine the reasons why such a converted generator was unsatisfactory for short arc welding revealed the similarity and differences of each process. Thus, in each process, the electrode is advanced steadily toward the molten weld pool and in each the transfer of the metal is principally by the electrode end repetitively contacting the weld pool, short circuiting the arc and then fusing off as small droplets which fall into the weld pool. The rate at which these short circuits occur divides the welding processes into one class or the other. Thus, in the heavy electrode welding process, the short circuits occur at the rate of about 10–12 per second, while in the short arc process, the short circuits occur at the rate of about 60–120 times per second. At the moment that the short circuits occur, the welding current of the generator attempts to rise rapidly at a rate determined primarily by the internal dynamic impedance of the generator itself. In the heavy electrode welding process, the welding proceeds more smoothly if the rate of current rise upon the shorting of the electrode end is kept within the range of 15–25,000 amperes per second. In the short arc process, difficulty is experienced unless the rate of current rise is at least 60,000 amperes per second and even greater for a uniform transfer of the metal at 60–120 shorts per second.

In order to have the high open circuit voltage required by the heavy wire process, the armature must have substantially more turns in each winding than with the constant potential short arc process. Thus, the armature windings have a substantially higher inductance and it was reasoned that if a generator having an armature with sufficient number of turns to provide the high open circuit voltage of the heavy electrode process were to be employed in a constant potential, lower open circuit voltage short arc process, means must be found to reduce the inductance of the armature circuit when it is supplying energy to the short arc process so as to increase the rate of current rise while at the same time maintaining the inductance and the lower rate of current rise for the heavy electrode process.

The present invention deals with a rotating, direct-current welding generator which may be employed to supply energy selectively to either the heavy electrode welding processes with its drooping voltage and low rate of current rise requirements of the short arc process with its constant voltage, high rate of current rise requirements.

It is known that when an effort is made to rapidly change the current in the armature of a welding generator, the corresponding rapid flux changes in the flux circuit about the armature winding generate a counter-electromotive force in the armature winding which oppose the change in the current.

The path of this changing flux may be divided as follows:

(1) Radially through the axis of the field poles and their air gaps;
(2) Radially through the interpoles and their air gaps;
(3) Circumferentially through the field pole cores and their air gaps; and,
(4) Circumferentially in the interpole cores and their air gaps.

In accordance with the broadest aspect of the invention, means are provided for opposing changes in flux in the field poles caused by the changes in the armature current, such means taking the form of current conducting loops or windings on at least the field pole cores of the same magnetic polarity which loops or windings have circumferentially and radially extending axes.

Further in accordance with the invention, auxiliary windings are provided on each field pole having sides along the armature facing surface and circumferentially facing surfaces of the field pole core and connected so as to oppose changes in the field pole flux caused by changes in the armature current.

Further in accordance with the invention, a rotating direct-current generator of the general type described is provided wherein the cumulative series field pole windings have a low resistance shunt and the number of turns in these windings are increased to compensate for the diversion of the current from such windings by the shunt. With this arrangement, rapid changes in the armature current are diverted to and flow through the shunt rather than the series field pole windings.

In accordance with one preferred aspect of the present invention, a direct-current welding generator including a rotating commutated armature winding; field poles; shunt field windings; output series field windings; and, interpoles having windings thereon is provided wherein;

(1) Each field pole is provided with a low impedance circuit about its radial axis which may take a number of forms such as: the shunt field itself and its completed circuit through its power source; a shorted turn in parallel with the field windings or axially extending welds on the circumferentially facing sides of the laminations forming the field pole cores.

(2) Each interpole has a shorted turn in parallel with the interpole winding for the same reason.

(3) Each field pole is provided with auxiliary electrically conducting loops or windings having generally circumferentially extending axes. These loops or windings may be either: in the form of welds extending axially along both the circumferentially facing and armature facing surfaces of the field pole laminations; or, in the form of low resistance shorted windings having sides in said surfaces and interconnected on the axial ends of the field pole core.

Such a generator has a high rate of current rise.

(4) Means are provided for optionally lowering such rate of rise which may take the form of a stabilizing transformer having its primary in series with the armature output and its secondary winding in series with the shunt field coils so polarized that voltages induced in the secondary oppose changes in the voltages induced in the shunt field windings due to current changes in the generator.

For heavy electrode welding, the series coils are differentially connected and the primary of the stabilizing transformer is in the output circuit while for short arc welding, the primary of the stabilizing transformer is not in series with the output circuit and the series coils are shunted by a low resistance and cumulatively connected.

In accordance with another and more preferred aspect of the present invention, a rotating, direct-current generator is provided having a rotating, commutated armature winding; a plurality of field poles, shunt field windings and cumulative series field windings on half of the field poles, differential series field windings on the other half of the field poles and interpoles having windings thereon wherein:

(1) Each interpole has an armature air gap not greater than two times the field pole clearance or not greater than 0.120 inch. The interpole windings are connected in series with the armature output and so polarized that the magnetomotive force established by such current opposes the magnetomotive force of the current in the armature. The close coupling of the two opposing magnetomotive forces reduces the flux leakage.

(2) Each field pole is provided with auxiliary electrically conducting loops or windings having generally circumferentially extending axes. These loops on the shunt winding field poles may take the form of: welds extending longitudinally along both the circumferentially facing surfaces and the armature facing surfaces of the field pole laminations; or low resistance windings having sides along such surfaces and all electrically interconnected on the axial faces of the field pole core. The loops on the differential winding field poles take the form of a winding having sides extending longitudinally along the circumferentially facing and armature facing surfaces of the field pole lamination and electrically connected in series by conductors extending across the axial ends of the field pole cores.

(3) The cumulative series field windings are shunted by a resistance substantially less than the direct-current resistance of the windings and the number of turns are increased correspondingly to compensate for the diversion of the current through the resistance.

In accordance with the invention, when the generator is used for short arc welding, the cumulative series windings are in series with the generator output and the field pole auxiliary windings are operative to lower the internal dynamic characteristics of the generator while, when the generator is used for heavy electrode welding, the cumulative series windings and the differential series windings are in series with the generator output but the auxiliary windings are inoperative such that the generator has a higher internal dynamic impedance.

The principal object of the present invention is the provision of a new and improved direct current welding generator which may be used without modification and interchangeably for either heavy wire or short arc electric welding.

A further object of the invention is the provision of a new and improved direct-current welding generator which can have selectively the high current recovery rate required by short arc constant potential welding or the lower current recovery rate required by heavy wire electrode welding.

A further object of the invention is the provision of a new and improved direct-current welding generator having selectively the required characteristics for either heavy electrode or short arc welding processes.

Another object of the invention is the provision of a new and improved direct-current welding generator having improved means for lowering its internal dynamic inductive impedance.

A further object of the invention is the provision of a new and improved direct-current welding generator having improved means for reducing the adverse effect of rapid current changes in the cumulative series field coils.

Another object of the invention is the provision of a new and improved arrangement for establishing counter-magnetomotive forces to oppose changes in the armature magnetomotive forces in a circumferential direction.

Another object of the invention is the provision of a new and improved direct-current welding generator which by simple selection of the output terminal, may be used either for a variable voltage, variable current arc welding operation or a constant potential, variable current arc welding operation.

Another object of the invention is the provision of a new and improved rotating direct-current welding generator which may optionally have a rate of current recovery in the range of from 15,000 to 100,000 amperes per second.

Another object of the invention is the provision of a new and improved direct-current welding generator having either an open circuit voltage of from 55–90 volts and a current rate of rise after an instantaneously imposed load of approximately 15,000 amperes per second, or a constant potential output with current variation and with a current rate of rise after an instantaneously imposed load in excess of 60,000 amperes per second.

Other and more specific objects will appear upon a reading and understanding of the following specification.

The invention may take physical form in certain parts and arrangements of parts, preferred embodiments of which will be described in detail in this specification and illustrated in the accompanying drawings which form a part hereof and wherein:

FIGURE 1 is a somewhat schematic and cross-sectional view of a direct current welding generator illustrating a preferred embodiment of the invention;

FIGURE 2 is a wiring diagram of the generator of FIGURE 1;

FIGURE 3 is a perspective view of a shunt field pole core showing the winding configuration of the auxiliary winding;

FIGURE 4 is a phantom view of FIGURE 3 showing the winding configuration thereof;

FIGURE 5 is a perspective view of a shunt field pole core showing in great detail the auxiliary winding thereon;

FIGURE 6 is a view similar to FIGURE 3 but showing an alternative form of the auxiliary winding with its terminals shorted;

FIGURE 7 is a perspective view of a field pole core showing an alternative form of a closed loop thereon obtained by means of axially extending welds in the surfaces thereof; and FIGURE 8 is a wiring diagram of an alternative embodiment of the invention.

Referring now to the drawings wherein the showings are for the purposes of illustrating preferred embodiments of the invention only and not for the purposes of limiting same, FIGURE 1 shows a direct current generator comprised of an armature A supported for rotation and adapted to be forcefully rotated by means not shown, a first pair of diametrically opposed shunt field poles B, a second pair of diametrically opposed series field poles C and four interpoles D, one positioned in each of the circumferential spaces between the field poles B and C.

The armature A is conventional in construction and consists generally of a stack of circular, edge-notched, magnetic laminations with the notches in axial alignment to form coil slots 11 in which are positioned the sides of the armature windings 12. These sides 12 connect to conventional commutator bars 14 in turn slidingly engaged by brushes 15.

The field poles B each includes a core 13 comprised of a stack of magnetic laminations so shaped as to have generally parallel, circumferentially facing, coil supporting surfaces 22 and a radially facing arcuate surface 23 spaced from the outside surface of the armature A a distance $t$. This space $t$ may be as desired, but it is normally from 0.045 to 0.060 inch. The core 13 also has the conventional circumferentially extending horns 24.

The field poles B, as is conventional and as shown in FIGURE 2, each have a multiturn shunt field pole winding 26 having a radial axis, which windings 26 are connected in electrical series with each other to an exciting generator 27 through a variable resistor 28.

Each field pole B also includes a cumulative series field winding 30 having a radial axis and is connected in series with the armature output with a polarization such that the magnetic flux generated by current flowing in this winding adds to the flux of shunt windings 26.

Also, disposed on each field pole B, is an auxiliary winding 35 having coil sides 36, 37 extending respectively axially in or along the armature facing surface 23 and in or along the circumferentially facing surfaces 22 of the core 13. The number of coil sides may be as desired, but in the embodiment shown, there are two coil sides 37 in each circumferentially facing surface and four coil sides spaced across the armature facing surface 23.

In accordance with the invention, the coil sides 36, 37 are so interconnected that the coil has both radially and circumferentially extending axes. While this interconnection may take a number of different forms, on the pole B the corresponding axial ends of each of the coil sides 36, 37 are electrically interconnected by a copper conductor plate 38, see FIG. 5 one on each end of the stacked laminations. This arrangement provides a plurality of shorted loops having both the radial and circumferentially extending axes. It will be noted that the construction of this auxiliary winding 35 is similar to the squirrel cage winding on a conventional alternating current induction motor.

The laminations of the core 13 of the field pole C are constructed identically to those of the field pole B and will not be described further herein and like reference characters will be used to indicate like parts.

The field poles C each include a differential series field winding 40 having a radially extending axis connected in electrical series with the armature winding 12 in such a manner that flux generated therein by current flowing therethrough is in a direction opposite to the flux in the armature windings 12 generated by the shunt windings 26.

The field poles C each also include an auxiliary winding indicated generally at 41 having a plurality of coil sides 42, 43 extending axially along the armature facing surface 23 and along the circumferentially facing surfaces 22 respectively. While any number of coil sides can be employed, in the embodiment shown, there are two each in each surface 22 and four in the armature facing surface 23. These coil sides 42, 43 are connected in electrical series relationship by conductors 44 extending across the ends of the pole core as best shown in FIGURE 3 such that the axes of the four turns face principally circumferentially. These windings each have terminals 44, 45 and are connected in electrical series with the armature winding 12 so that the flux generated by currents flowing therein is opposed to the circumferential flow of flux about the armature winding 12.

Each of the cumulative series field windings 30 is shunted with a resistor 70 having a resistance substantially less than the resistance of the winding 30 and the number of turns in the windings 30 is increased to compensate for the diversion of the series currents through these windings in an amount so that the number of ampere turns remains the same. While the ratio of the resistance of the winding 30 to that of the resistor 30 may be as desired, a ratio of approximately 10 to 1 has been found adequate. Inasmuch as the resistance of the winding 30 may be on the order of 0.001 ohm, the resistance of the resistor 70 will then be on the order of 0.0001 ohm. The winding 30 has an even higher ratio of inductive impedance compared to the shunt resistor and thus offers very high impedance to any rapid changes in current so that in effect any such changes are diverted to and flow only in the shunt resistor 70. Such changes cannot depress the shunt field excitation as would be the case if the shunt resistor 70 were omitted.

The interpoles D each comprise a core 50 made up of a conventional stack of magnetic laminations having circumferentially facing surfaces 51 and an arcuate armature facing surface 52 spaced from the outer surface of the armature a distance $s$. These laminations also have a beveled surface 53 in close spaced relationship to the ends of the horns 24. The spacing s instead of being approximately 0.250 inch as heretofore, is in accordance with the invention not more than twice the spacing $t$ of the field pole surface 23 from the armature and preferably is approximately 0.080 inch.

Each interpole D includes a winding 55, all of which, as shown in FIGURE 2, are connected in electrical series relationship with each other and between a common output terminal G and one of the brushes 15. These coils are so connected that the flux generated by currents flowing therein is opposed to the armature flux in the air gap.

In the preferred embodiment, the cumulative series windings 30 on each field pole B are connected in electrical series relationship with each other between the other of the brushes 15 and a common lead 60. This lead 60 in turn connects either: in series with the series field pole auxiliary windings 41 to an output terminal M or in series with the differential series field pole windings 40 to an output terminal S. These series field pole windings 40 are in turn shunted by a conventional reactor diverter control 45, adjustment of which controls the slope of the volt ampere curve when the generator is used to provide welding current through output terminal S.

The generator will supply a constant-potential, variable-current output between terminals G and M and a variable-voltage, variable-current output between terminals G and S. Adjustment of rheostat 28 determines the open circuit voltage of the generator.

*Operation*

In operation the field pole windings 26 are electrically energized by the generator 27 through the variable resistor 28. The flux generated by such current flows radially from the field poles B into the armature A. The amount of energization of the coils 26 and the number of turns in the windings 12 determine the open circuit voltage of the generator appearing between terminal G and either terminals S or M. In accordance with the preferred embodiment, the number of turns in the windings 26 and in the armature windings 12 are such that the generator will have a maximum open circuit voltage of at least 90 volts. To reduce the voltage for short arc welding, the resistance of resistor 28 is increased until the voltage is as desired.

It will be appreciated that when no load is applied to the generator, the field poles C are not excited.

When a load is applied between terminals G and S, current flows in the differential series field windings 40 creating a flux therein in opposition to the flux generated by the field coils 26 and the voltage output of the generator decreases proportionately to the amount of current flowing in the load.

A portion of this same current also flows in the cumulative series windings 30 but the number of ampere turns in these windings is substantially less than that in the windings 40 so that the ultimate effect is a reduction in the output voltage of the generator. Also at the higher open circuit voltages, the core 13 of field pole 8 is operating at or near flux saturation so that increases in the exciting force caused by currents in the windings 30 do not produce proportionate increase in flux.

When a load is connected between terminals G and M, the current flows in the cumulative series field windings 30 which are connected so that their flux adds to that of the field coils 26 to tend to increase the generator output voltage with an increase in current. The number of ampere turns on the windings 30 are proportioned so as to tend to increase the output voltage of the generator in an amount equal to the resistance and reaction losses in the generator so that the output voltage of the generator remains generally constant with an increase in current. In this respect it is to be noted that normally when the load is connected between terminals G and M, the current in the field coils 26 has been reduced to an amount so that the open circuit voltage is on the order of 30 volts and the core 13 of field pole B is operating substantially below magnetic flux saturation.

When supplying electric power to an electric arc welding circuit, the generator is repetitively being subjected to momentary short circuits and the rate of current rise immediately after such short circuits have been imposed has an important effect on the welding. As hereinbefore pointed out, for heavy wire electrode arc welding, a maximum rate of current rise of from 15,000 to 25,000 amperes per second is desirable. On the other hand, for short arc welding, a minimum rate of current rise of from 60,000 to 90,000 amperes per second is desirable.

In the embodiment shown, when the load is connected between terminals G and S, the generator has an ampere rate of rise on the order of 15,000 to 25,000 amperes per second and when connected between terminals G and M, has a rate of current rise well in excess of 60,000 amperes per second.

As an important feature of the present invention, the rate of rise of the current in the generator upon imposing a short circuit thereon may be readily selected by connecting the generator output either in series with the auxiliary windings 41 or by omitting these windings from the output circuit.

In operation, rapid changes in the armature current establish magnetomotive forces in four paths within the generator as follows:

Path T radially across the field pole air gaps and through each of the field pole cores;

Path U radially across the interpole air gap and through the interpole core;

Path V across the field pole air gap and circumferentially in the field pole core; and, A fourth path across the interpole air gap and circumferentially in the interpole core but this flux path is insignificant and the present invention does not consider it.

Auxiliary windings 35 on the field poles B establish countermagnetomotve forces opposing the circumferential flow of flux in the path V through the field pole core B.

Auxiliary windings 41 when connected in series with the output and properly polarized oppose changes in the circumferential flow of flux in the path V in the field poles C.

The interpole windings establish magnetomotive forces opposing the flow of flux in the path U and by closing the air gap down to a distance not greater than twice the field pole spacing $t$, the reluctance of this air gap is substantially reduced and the magnetomotive forces established by the interpole windings are effective to prevent changes in the flux in the path U.

The cumulative series windings 30, as shunted by the resistor 70, establish magnetomotive forces opposing flux changes in the path T through the field poles B. It is to be noted that the auxiliary winding 35 also has a radially extending axis and such winding also establishes magnetomotive forces opposing the change of flux in the path T.

In addition to this, it is to be noted that the inductance of the cumulative series windings 30 tends to oppose any rapid change of current therethrough and such rapid changes are diverted to the shunting resistor 70 so that such rapid changes have no effect on the flux generated by the windings 30. However, the flux generated by the windings 30 is affected by the average current flowing through the windings 30 and the resistors 70.

With the auxiliary windings 41 connected in series with the generator output, magnetomotive forces are established to oppose any rapid changes in the flux about the armature windings 12 in substantially all of the paths which such flux might take through the generator. When the windings 41 are connected in series with the generator output, rates of current rise in excess of 60,000 amperes are readily obtainable.

However, as hereinbefore pointed out, for heavy wire electrode welding which includes submerged arc or stick welding, such high rates of current rise are undesirable and in accordance with the present invention, means are provided for removing the auxiliary windings 41 from the output circuit. Such means may take a number of forms such as a shunting switch, but in the embodiment of the invention shown, the generator has two output terminals S and M. The terminal S is for heavy wire electrode welding and as noted, is connected in series with the differential series windings 40, but the auxiliary windings 41 are not in this series circuit. The generator so connected has a current rate of rise on the order of 15,000 to 20,000 amperes per second and has the desired drooping volt ampere curve required for heavy electrode welding.

For short arc welding, the terminal M is employed, in which event it is noted from FIGURE 2 that the differential series field coils 40 are not in the circuit, but the auxiliary windings 41 are now in series with the generator output.

The preferred embodiment of the invention thus has a first pair of field poles B, which are shunt excited by an independent power source 27 and a second pair of field poles C which are differentially series excited when the output terminals G and S of the generator are employed.

The invention may be employed on a generator wherein all of the field poles are shunt excited and all of the field poles have series windings.

FIGURE 8 shows a circuit diagram of such a generator and in this circuit parts corresponding to the parts of the embodiment of FIGURES 1 and 2 will be given like reference characters.

Thus, a generator of FIGURE 8 includes four field poles G' which are all identical in construction. Each field pole G' includes a conventional shunt winding 80 and all of these windings 80 are connected in electrical series with the secondary 81 of a stabilizing transformer 82, resistor 28 and exciting generator 27.

Additionally, each field pole G' includes a series winding 84, all of such windings being connected in electrical series. In addition, each field pole G' includes a single shorted loop 86 having a radially extending axis. These windings are all on a common core 13' made up of a stack of magnetic laminations. Such loop may take a number of different forms such as the shunt field winding and its completed circuit through generator 27, the winding 35 of FIGURE 5 or the winding 84 with a shunt resistor 85. Alternatively, and preferably, the winding may take the form of longitudinally extending welds 75, 76 in the armature facing surface and circumferentially facing surfaces of the field pole core 13' as shown in FIGURE 7. These welds electrically connect all of the laminations such that the welds with the laminations themselves form a shorted loop having circumferentially and radially extending axes.

Each interpole D is provided with shorted loop 90 in the form of a copper sleeve surrounding the core itself, the construction on which is obvious and not shown.

When it is desired to do short arc welding, the windings 84 are connected so that the flux adds to that of the field windings 80. These windings 84 are shunted by a resistance 85 which has a resistance approximately 1/10 that of the resistance of the windings 84. When it is desired to do heavy electrode welding, the windings 84 are connected such that the flux is opposed to that generated by the shunt field windings 80 and to control the amount of the differential action, a variable resistor 86 is connected in parallel with the windings 84. Also when it is desired to do heavy electrode welding, the output of the generator is connected in series with the primary 83 of stabilizing transformer 82, the polarity being such that changes in output current in the winding 83 induce voltages in winding 81 in opposition to voltages induced in the field windings 80 by such changes.

While the reversal of the polarity of the windings 84 and the connection of the primary 83 in the welding circuit may be accomplished in a number of different ways, in the preferred embodiment, a three pole, double throw switch 91 is employed, connected generally as shown such that when the switch is in the left hand position as shown in FIGURE 8, the terminal M' is energized, the shunt resistor 85 is in the circuit and the coils 84 are properly polarized. In this instance, terminal S' is dead. When it is desired to weld with heavy electrode welding, the switch is moved to the right hand position, in which instance the terminal S' is energized, the terminal M' is dead, the resistor 86 is in shunt with the windings 84, the polarity of the windings 84 has been reversed and the primary 83 of the stabilizing transformer 82 is in the circuit.

With the switch in the left hand position, all of the flux paths for the armature flux have means for establishing countermagnetomotive forces to oppose any change in the armature flux and the desired high rate of current rise required for short arc welding can be obtained. When the switch 90 is in the right hand position, the stabilizing transformer 82 functions to lower the rate of current rise of the generator and the generator characteristics are proper for the heavy electrode welding.

While the invention has been specifically described with reference to a four pole generator, obviously it is equally applicable to a two or six pole generator.

Also auxiliary windings or loops have been shown on all of the field poles. Obviously, so long as they are on poles of the same magnetic polarity, this should be sufficient.

In general, in the first embodiment described, the following steps have been taken to obtain the proper operating characteristics of the generator, namely:

(1) Moving the interpole core close to the armature so that the interpole air gap is not greater than twice the field pole air gap.

(2) Shunting the cumulative series winding with a resistor of substantially lower resistance than the direct current resistance o fthe winding and increasing the number of turns in such winding to maintain the same number of ampere turns notwithstanding the shunt.

(3) Providing on one pair of field poles a short circuited loop having a circumferentially extending axis, providing on the other pair of field poles an auxiliary winding having a circumferentially extending axis which winding by being selectively connected in series with the generator output or by being disconnected therefrom, will change the rate of current rise to the generator from the in excess of 60,000 amperes per second desired for short arc welding to a 15,000 to 20,000 amperes per second desired for heavy wire electrode welding.

In the second embodiment of the invention, the following steps were taken:

(1) Each of the field poles and the interpoles were provided with shorted loops having radially extending axes.

(2) The series field windings when connected cumulatively have a shunting resistor of substantially lower resistance than the direct current resistance of the winding and when connected differentially, have a higher variable resistance in shunt therewith.

(3) Each field pole has a shorted loop having a circumferentially extending axis.

(4) When the series field windings are differentially connected, the output of the generator flows through the primary of a stabilizing transformer, the secondary of which is in a series with the shunt field windings and so polarized that voltages induced therein by output current changes are in opposition to voltages induced in the shunt field windings by such current changes in the armature windings.

Thus it will be seen that preferred embodiments of the invention have been described which accomplish all of the objectives heretofore set forth and others and that direct-current welding generators have been provided which, by appropriate selection of the electrical connection, can be selectively used for welding processes requiring either high or low rates of current rise.

Obviously, modifications and alterations will occur to others upon a reading and understanding of this specification and it is my intention to include all such modifications and alterations insofar as they come within the scope of the appended claims.

Having thus described our invention, we claim:

1. A direct-current generator having:
   a rotatable armature having windings connected to commutation bars and brushes engaging said bars, said windings being adapted to supply electric current to a load;
   a pair of diametrically opposed field poles each including a magnetically permeable core having an armature facing surface and circumferentially facing surfaces;
   means exciting said poles with alternate magnetic polarity;
   the improvement which comprises: at least one of said poles including an auxiliary current conducting loop having an axially extending side in the armature facing surface and a second axially extending side radially spaced from such surface, said current conducting loop being so arranged as to oppose circumferential changes in flux in the pole core caused by changes in armature current.

2. A direct-current generator having:
   a rotatable armature having windings connected to commutator bars and brushes engaging said bars, said windings being adapted to supply electric current to a load;
   first, second and third pairs of diametrically opposed field poles arranged in spaced relationship around said armature;
   each pole including a magnetically permeable core having an armature facing surface and circumferentially facing surfaces;
   means magnetically exciting said poles with alternate magnetic polarity;
   the improvement which comprises: at least the poles of like magnetic polarity including an auxiliary current conducting loop having an axially extending side in the armature facing surface and axially extending sides radially spaced from such surface and so arranged as to oppose circumferential changes in flux in the pole caused by changes in the armature current.

3. A direct-current generator having:
   a rotatable armature having windings connected to commutator bars and brushes engaging said bars, said windings being adapted to supply electric current to a load;
   first and second pairs of diametrically opposed field poles arranged in spaced relationship around said armature;
   each field pole including a magnetically permeable core having an armature facing surface and circumferentially facing surfaces;
   means exciting said poles with alternate magnetic polarity;
   the improvement which comprises: at least the field poles of like magnetic polarity including an auxiliary current conducting loop having an axially extending side in the armature facing surface and an axially extending side radially spaced from such surface, said current conducting loop being so arranged as to oppose circumferential changes in flux in the pole core caused by changes in the armature current.

4. In a direct current generator comprising:
   a rotatable armature having windings connected to commutator bars and brushes engaging said bars, said windings being adapted to supply electric power to a load;
   an even number of field poles arranged in spaced relationship around said armature;
   each pole including a magnetically permeable core having an armature facing surface and circumferentially facing surfaces;
   means exciting said poles with alternate magnetic polarity;
   the improvement which comprises: at least the field poles of one magnetic polarity having an auxiliary current conducting loop so arranged as to oppose changes in the flux flowing circumferentially in the field pole cores caused by changes in the armature current.

5. The improvement of claim 4 wherein said auxiliary loop includes an axially extending electrically conductive member in the armature facing surface forming one side of a current conducting loop and an axially extending electrically conductive member radially spaced from the armature surface forming the other side of the loop.

6. The improvement of claim 4 wherein the loop has a radially circumferentially extending axis.

7. The improvement of claim 4 wherein the core is laminated and the auxiliary loop is formed by axially extending welds at least one in the armature facing surface and at least one in each circumferentially facing surface of the core.

8. The improvement of claim 4 wherein the auxiliary loop is comprised of axially extending conductor members at least one in each of the armature and circumferentially facing core surfaces and conductor means connecting the corresponding axial ends of all said members so that said members are in parallel relationship.

9. The improvement of claim 4 wherein the auxiliary loop is comprised of axially extending conducting members at least one in each of the armature and circumferentially facing of said core surfaces, a plurality of conductor means on the axial ends of said core arranged to connect all said members in series relationship so that currents in the armature facing surface members are in one direction and currents in the circumferentially facing surface members are in the opposite direction, said loop having two terminals and means connecting said terminals together.

10. The improvement of claim 4 wherein the auxiliary loop is comprised of axially extending conducting members at least one in each of the armature and circumferentially facing surfaces of said core, conductor means on the axial ends of said core connecting said members in series relationship whereby said loop has two terminals, means connecting said terminals to the load circuit whereby the auxiliary loop is in series with the load and so polarized as to oppose changes in the flux in said field pole core caused by changes in the armature current.

11. The improvement of claim 10 including means for disconnecting said loop from said load circuit.

12. A direct-current generator having:
   a rotatable armature having windings connected to commutator bars and brushes engaging said bars, said windings being adapted to supply electric current to a load;
   first and second pairs of diametrically opposed field poles arranged in spaced relationship around said armature;
   each field pole including a magnetically permeable core having an armature facing surface and circumferentially facing surfaces;
   shunt field windings on each of said cores adapted to be energized from a D.C. source of power and to excite said poles with alternate magnetic polarity, series field windings on each of said cores;
   the improvement which comprises: each of said field poles possessing an auxiliary current conducting loop having an axially extending side in the armature facing pole surface and an axially extending side radially spaced from said surface, said loop being so connected as to oppose circumferential changes in flux in the pole core caused by changes in the armature current.

13. The improvement of claim 12 wherein said pole cores are laminated and the axially extending sides of said loop are formed by welds at least one in each of the armature and the circumferentially facing surfaces of said core.

14. The improvement of claim 12 wherein said sides are each formed by a conductor member and means on the axial end of said cores electrically connect all of said sides in electrical parallel relationship.

15. The improvement of claim 12 wherein interpoles are positioned in the spaces between said field poles, said interpoles including a winding in series with the load circuit and including a shunted loop around the interpole core.

16. The improvement of claim 12 wherein a stabilizing transformer is provided having a secondary in series with the shunt field windings and its energizing power source and a primary in series with the load and the armature so polarized that changes in armature current induce voltages in the secondary in opposition to voltages induced in the shunt field windings by the armature current changes.

17. The improvement in claim 12 wherein each pair of field poles includes a series winding, said windings being adapted to be connected in series with the load and means for changing the direction of current flow therein so as to cumulate or differentiate the flux of the shunt field windings.

18. The improvement of claim 17 wherein the series windings when cumulatively connected are shunted by a resistor having a resistance substantially less than the direct current resistance of the windings.

19. A direct-current generator having:
a rotatable armature having windings connected to commutator bars and brushes engaging said bars, said windings being adapted to supply electric current to a load;
first and second pairs of diametrically opposed field poles arranged in spaced relationship around said armature, each field pole including a magnetically permeable core having an armature facing surface and circumferentially facing surfaces, shunt field windings on said first pair of field poles, series windings on said first pair of field poles adapted to be cumulatively connected in series with the load, series windings on said second pair of field poles adapted to be differentially connected in series with the load, said first pair of field poles including an auxiliary winding or loop having an axially extending side in the armature facing surface and axially extending sides radially spaced from such surface and means electrically connecting the corresponding ends of said sides whereby they are all in electrical parallel relationship, an auxiliary winding on said second pair of field poles having axially extending sides in the armature facing surface and axially extending sides radially spaced from such surface, means on the axial end of said cores connecting said sides in electrical series relationship whereby the currents in the sides in the armature facing surface all flow in the same direction and said winding has terminals and means for optionally causing currents to flow in said winding to oppose circumferential changes in flux in the pole core caused by changes in the armature current.

20. The improvement of claim 19 wherein means are provided for connecting said cumulative series windings and said series auxiliary windings in series with the load.

21. The improvement of claim 19 wherein means are provided for connecting said differential windings in series with the load and disconnecting said series auxiliary windings from the load.

22. The improvement of claim 19 wherein interpoles including a core and a winding are positioned in the spaces between said field poles, said windings being connected in series with the load and so polarized as to oppose changes in flux in the interpole core caused by changes in the armature current, said interpoles being spaced from said armature surface by a distance not greater than twice the spacing of the field pole cores from the armature surface.

23. The improvement of claim 22 wherein said cumulative series windings are shunted by a resistor having a resistance substantially less than the resistance of said windings.

References Cited

UNITED STATES PATENTS

| | | | |
|---|---|---|---|
| 2,300,520 | 11/1942 | Pollard | 310—183 |
| 2,303,481 | 12/1942 | Liwschitz | 310—183 |
| 2,000,699 | 5/1935 | Harding | 310—87 |
| 2,291,008 | 7/1942 | Tyrner | 310—184 |

MILTON O. HIRSHFIELD, *Primary Examiner.*

L. L. SMITH, *Assistant Examiner.*